Figure 1:
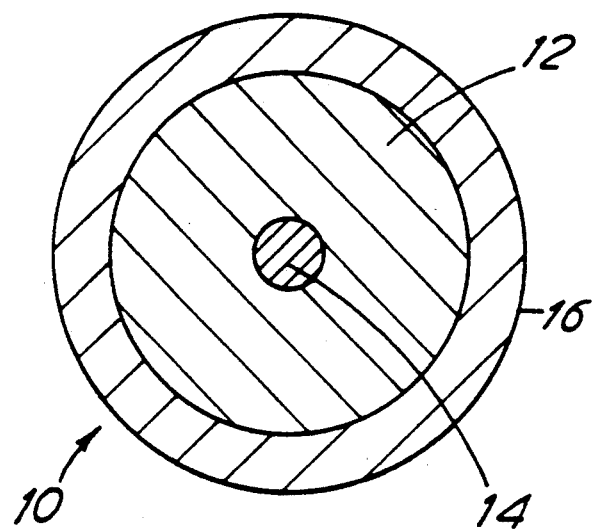

United States Patent [19]

Hanna

[11] Patent Number: 5,291,501
[45] Date of Patent: Mar. 1, 1994

[54] OPTICAL FIBRE WITH DOPED CORE AND DOPED INNER CLADDING, FOR USE IN AN OPTICAL FIBRE LASER

[75] Inventor: David C. Hanna, Southhampton, United Kingdom

[73] Assignee: University of Southhampton, Southampton, United Kingdom

[21] Appl. No.: 920,442
[22] PCT Filed: Dec. 11, 1990
[86] PCT No.: PCT/GB90/01936
§ 371 Date: Aug. 20, 1992
§ 102(e) Date: Aug. 20, 1992
[87] PCT Pub. No.: WO91/10272
PCT Pub. Date: Jul. 11, 1991

[30] Foreign Application Priority Data

Dec. 22, 1989 [GB] United Kingdom ............... 89 28992

[51] Int. Cl.$^5$ ............................. H01S 3/07; G02B 6/22
[52] U.S. Cl. ......................................... 372/6; 385/126; 385/127
[58] Field of Search ............... 372/6, 41, 69; 385/126, 385/127, 142, 144

[56] References Cited

U.S. PATENT DOCUMENTS

| 3,805,186 | 4/1974 | Woodcock | 372/6 |
| 4,815,079 | 3/1989 | Snitzer et al. | 385/127 |
| 4,829,529 | 5/1989 | Kafka | 372/6 |
| 5,121,460 | 6/1992 | Tumminelli et al. | 385/126 |
| 5,170,458 | 12/1992 | Aoyagi et al. | 385/127 |

FOREIGN PATENT DOCUMENTS 320990 6/1989 European Pat. Off. .

OTHER PUBLICATIONS

Hanna, et al., "Efficient High-Power Continuous-Wave Operation Of Monomode Tm-Doped Fibre Laser at 2 μm Pumped by Nd: YAG Laser At 1·064μM", Sep. 28, 1989, pp. 1365-1366, Electronic Letters vol. 25, No. 20.

Primary Examiner—Frank Gonzalez
Attorney, Agent, or Firm—Flynn, Thiel, Boutell & Tanis

[57] ABSTRACT

An optical fiber laser includes an optical fiber having a core (14), an inner cladding (12) surrounding the core and an outer cladding (16) surrounding the inner cladding and core. The core (12) is doped with a first laser-active material, preferably, thulium. The inner cladding is doped with a second different laser-active material, for example, neodymium and is pumped by a multimode pump light source such as a diode array. Pumping of the inner cladding (12) causes laser emission in the inner cladding material which, in turn, serves as pump radiation for the laser-active dopant in the core (14).

12 Claims, 1 Drawing Sheet

OPTICAL FIBRE WITH DOPED CORE AND DOPED INNER CLADDING, FOR USE IN AN OPTICAL FIBRE LASER

FIELD OF THE INVENTION

The present invention relates to monomode optical fibre lasers and fibres for use therein and, in particular, to those comprising a core, an inner cladding surrounding the core and an outer cladding surrounding the inner cladding and core.

BACKGROUND OF THE INVENTION

Monomode optical fibre lasers have a doped, active core of very small dimensions, typically, a few microns. The fact that the core only supports one mode because of its small size, is a major benefit and is a necessary feature in most applications of optical fibre lasers and amplifiers. Unfortunately, however, the small core dimension also means that the optical fibre laser can only be pumped effectively by a laser whose beam has essentially perfect spatial properties, that is, a single mode beam.

Diode lasers offer a convenient pump source but the power available as a single mode beam from diode lasers is limited. Much higher power, up to several watts, can be obtained from diode lasers in the form of arrays. However, in such arrays, the beam produced is highly multimode and not suitable for launching directly into the monomode fibre core.

One proposal for dealing with this difficulty is to use cladding pumping. The active doped monomode core is surrounded by a much larger cladding, which is undoped and, hence, transparent. This cladding is then surrounded by an outer cladding so that any light launched into the inner cladding is guided within the inner cladding in the same way that light is guided in a conventional optical fibre. This arrangement permits a multimode beam, from, say, a diode laser array, to be launched into the inner cladding and then, as it propagates, light from the multimode beam will leak into the monomode core. This enables the core to be pumped by a multimode beam, and eventually all of the absorbed multimode power will be converted into a monomode laser emission within the core. Thus, this arrangement can provide the major benefit of increasing the brightness of a high-powered diode array beam and can, consequently, be used in a large number of applications.

In accordance with a first aspect of the invention, there is provided an optical fibre laser having an optical fibre comprising a core; an inner cladding surrounding the core and an outer cladding surrounding the inner cladding and the core; and a light source, characterised in that the core is doped with a first laser active material, the inner cladding is doped with a second different laser active material and the light source is a multimode source arranged to pump the inner cladding so as to cause laser emission therein which, in turn, serves as pump radiation for the laser active dopant in the optical fibre core.

In accordance with a further aspect of the invention, there is provided an optical fibre for use in an optical fibre laser, the fibre comprising a core; an inner cladding surrounding the core, and an outer cladding surrounding the inner cladding and core, the fibre being characterised in that the core is doped with a first laser active material and the inner cladding is doped with a second, different laser active material such that, when the inner cladding is pumped so as to cause laser emission therein, the laser emission in the inner cladding, in turn, serves as pump radiation for the laser active dopant in the optical fibre core.

Thus, the inner cladding can be pumped by means of a diode array or any other appropriate multi-mode pump beam. The ends of the fibre are terminated in mirrors, in the usual optical fibre laser configuration, so that lasing occurs in the multimode inner cladding. Laser light produced in the inner cladding then leaks into the monomode core, where it serves as the pump radiation for the laser-active dopant in the core. This in turn lases, using the same end mirrors which are designed to have high reflectivity at the laser wavelength appropriate to the inner cladding dopant and the core dopant.

This arrangement has a number of benefits over the earlier cladding pumping arrangement utilising a transparent inner cladding.

Firstly, it permits the pump radiation from the diode array to be absorbed in a much shorter length since it is absorbed directly by the inner cladding rather than by leakage into the core. This shorter length has several advantages, for example, it allows short pulse operation when Q-switched and it avoids excessive losses. Secondly, the laser intensity in the lasing inner cladding can be much higher than the intensity of the light from the pump source. The optical fibre laser of the invention is, consequently, particularly well suited to pumping a 3-level laser material in the core. 3-level laser materials need higher pump intensities than 4-level lasers. Since many of the more potentially useful fibre lasers use three-level materials, this latter advantage is of great importance.

Whilst the benefits outlined above are the most important, there are other ways in which the use of the optical fibre laser of the invention could be beneficial. For example, incoherent lamps could be used to pump the inner core transversely, the inner core would then transfer power through multimode laser oscillation into the monomode core. Monomode output has reasonable efficiency using an incoherent lamp as pump source should, thus, be achievable.

An optical fibre laser in accordance with the invention will now be described in detail, by way of example, with reference to the drawing in which is a schematic cross-section through the optical fibre of the invention.

The optical fibre 10 shown in FIG. 1 has an inner cladding 12 doped with neodymium and a monomode core 14 doped with thulium. A suitable outer cladding 16 surrounds the inner cladding 12 and core 14.

The inner cladding is made to lase by pumping with a diode array (not shown) to provide laser light at 1.06 $\mu$m. The laser light output by the neodymium pumps the core 14 which itself provides a laser output at 2 $\mu$m. Thus, the optical fibre may provide conversion from the multimode output of the diode array to monomode output at 2 $\mu$m.

There are a number of applications in which the availability of a simple all solid state source with a monomode power level around 1 watt. Since diode lasers themselves are not capable of providing the required beam quality, use of the optical fibre laser of the invention offers a potentially significant breakthrough in these applications since the cheapness and reliability of diodes can be exploited but, at the same time, their beam properties can be enhanced without excessive loss of efficiency.

I claim:

1. An optical fibre laser, comprising an optical fibre which serves as a resonant cavity and which includes: a core; an inner cladding surrounding the core; an outer cladding surrounding the inner cladding and the core; and a light source, wherein the core is doped with a first laser active material, the inner cladding is doped with second laser active material different from the first laser active material, and the light source is a multimode source arranged to pump the inner cladding so as to cause laser emission therein which, in turn, serves as pump radiation for the laser active dopant in the optical fibre core.

2. Apparatus according to claim 1, in which the first laser active material is a 3-level laser material.

3. Apparatus according to claim 2, in which the first laser active material is thulium.

4. Apparatus according to claim 1, in which the second laser active material is neodymium.

5. An optical fibre laser, comprising:
an optical fibre which serves as a resonant cavity and which includes:
a core doped with a first laser active material;
an inner cladding which surrounds said core, said inner cladding being doped with a second laser active material different from said first laser active material;
an outer cladding surrounding said inner cladding and said core; and
a light source arranged to pump said inner cladding, said light source being a multimode source;
wherein pumping of said inner cladding by said light source causes laser emission therein which, in turn, serves as pump radiation for said first laser active material in said core.

6. Apparatus according to claim 5, in which said first laser active material is a 3-level laser material.

7. Apparatus according to claim 6, in which said first laser active material is thulium.

8. Apparatus according to claim 5, in which said second laser active material is neodymium.

9. An optical fibre for use in an optical fibre laser, said optical fibre comprising:
a core doped with a first laser active material;
an inner cladding which surrounds said core, said inner cladding being doped with a second laser active material different from said first laser active material; and
an outer cladding surrounding said inner cladding and said core.

10. Apparatus according to claim 9, in which said first laser active material is a 3-level laser material.

11. Apparatus according to claim 10, in which said first laser active material is thulium.

12. Apparatus according to claim 9, in which said second laser active material is neodymium.

* * * * *

UNITED STATES PATENT AND TRADEMARK OFFICE
CERTIFICATE OF CORRECTION

PATENT NO. : 5 291 501

DATED : March 1, 1994

INVENTOR(S) : David Colin HANNA

It is certified that error appears in the above-identified patent and that said Letters Patent is hereby corrected as shown below:

Column 1, lines 49-68; delete in their entirety and replace them with the following paragraph:

In accordance with the invention, an optical fibre laser includes an optical fibre having a core; an inner cladding surrounding the core, and an outer cladding surrounding the inner cladding and the core; and includes a light source, wherein the core is doped with a first laser active material, the inner cladding is doped with a second different laser active material, and the light source is a multimode source arranged to pump the inner cladding so as to cause laser emission therein which, in turn, serves as pump radiation for the laser active dopant in the optical fibre core.---.

UNITED STATES PATENT AND TRADEMARK OFFICE
CERTIFICATE OF CORRECTION

PATENT NO. : 5 291 501

DATED : March 1, 1994

INVENTOR(S) : David Colin HANNA

It is certified that error appears in the above-identified patent and that said Letters Patent is hereby corrected as shown below:

Column 2, lines 1 through 4; delete in their entirety.

Column 2, between lines 44 and 45 insert:

Column 2, line 47; change "drawing in" to ---drawing,---.

Column 2, between lines 48 and 49 insert:

Column 2, line 49; after "1" insert ---, which inherently forms the resonant cavity of an optical fibre laser---.

Signed and Sealed this

Twenty-third Day of August, 1994

Attest:

BRUCE LEHMAN

Attesting Officer

Commissioner of Patents and Trademarks